US010424992B2

(12) United States Patent
Bruckhoff et al.

(10) Patent No.: US 10,424,992 B2
(45) Date of Patent: Sep. 24, 2019

(54) FLUID-DYNAMIC BEARING SYSTEM

(71) Applicant: Minebea Co., Ltd., Nagano-ken (JP)

(72) Inventors: Michael Bruckhoff, Tennenbronn (DE);
Tobias Kirchmeier, St. Georgen (DE);
Olaf Winterhalter, Epfendorf (DE);
Andreas Kull, Donaueschingen (DE);
Jorg Hoffmann,
Villingen-Schwenningen (DE)

(73) Assignee: MINEBEA MITSUMI INC., Nagano (JP)

( * ) Notice: Subject to any disclaimer, the term of this patent is extended or adjusted under 35 U.S.C. 154(b) by 451 days.

(21) Appl. No.: 14/878,385

(22) Filed: Oct. 8, 2015

(65) Prior Publication Data

US 2016/0102706 A1    Apr. 14, 2016

(30) Foreign Application Priority Data

Oct. 14, 2014 (DE) .......................... 10 2014 014 962

(51) Int. Cl.
| | |
|---|---|
| *H02K 7/08* | (2006.01) |
| *F16C 33/10* | (2006.01) |
| *H02K 5/167* | (2006.01) |
| *F16C 33/74* | (2006.01) |
| *F16C 17/10* | (2006.01) |

(52) U.S. Cl.
CPC ........... *H02K 7/086* (2013.01); *F16C 17/105* (2013.01); *F16C 33/743* (2013.01); *H02K 5/1677* (2013.01); *F16C 33/103* (2013.01); *F16C 33/745* (2013.01); *F16C 2370/12* (2013.01)

(58) Field of Classification Search
CPC .. F16C 33/107; F16C 17/105; F16C 32/0429; H02K 7/00; H02K 7/20
USPC .................................. 310/90, 67 R; 381/110
See application file for complete search history.

(56) References Cited

U.S. PATENT DOCUMENTS 6,019,516 A * 2/2000 Leuthold ............... F16C 17/105
384/110
8,144,423 B2 3/2012 Sekii
(Continued)

FOREIGN PATENT DOCUMENTS

| DE | 19781854 | 7/1999 |
|---|---|---|
| DE | 102009038034 | 2/2011 |

(Continued)

*Primary Examiner* — Thomas Truong
(74) *Attorney, Agent, or Firm* — Cooper & Dunham LLP

(57) ABSTRACT

The invention relates to a fluid-dynamic bearing system, in particular for the rotary support of a spindle motor, the bearing system comprising: a first conical bearing and a second conical bearing counteracting the first conical bearing, a fixed shaft along which the two conical bearings are arranged, a sleeve, a first and a second conical bearing component, which together with the sleeve form the first and second conical bearings, bearing structures applied to the sleeve and/or the conical bearing components, a bearing gap filled with a bearing fluid extending between the sleeve and the shaft and between the sleeve and the conical bearing components and sealed at each of its ends by a conical capillary seal, and a hub which rotates together with the sleeve about a rotation axis. The invention is characterized in that a pump seal is arranged between the first conical bearing and the adjacent capillary seal.

18 Claims, 1 Drawing Sheet

(56) References Cited

U.S. PATENT DOCUMENTS

| | | | | |
|---|---|---|---|---|
| 2006/0255673 A1* | 11/2006 | Sekii | ............... | F16C 17/105 |
| | | | | 310/90 |
| 2008/0260310 A1* | 10/2008 | Bauer | ............... | F16C 17/107 |
| | | | | 384/107 |
| 2009/0110337 A1* | 4/2009 | Jiang | ............... | F16C 33/107 |
| | | | | 384/120 |
| 2009/0140587 A1* | 6/2009 | Popov | ............... | F16C 17/107 |
| | | | | 310/90 |
| 2009/0231754 A1* | 9/2009 | Sekii | ............... | F16C 17/10 |
| | | | | 360/99.08 |
| 2010/0277831 A1* | 11/2010 | Efinger | ............... | F16C 17/105 |
| | | | | 360/99.08 |

FOREIGN PATENT DOCUMENTS

| | | |
|---|---|---|
| DE | 102009049154 | 4/2011 |
| JP | 2003049829 | 2/2003 |

\* cited by examiner

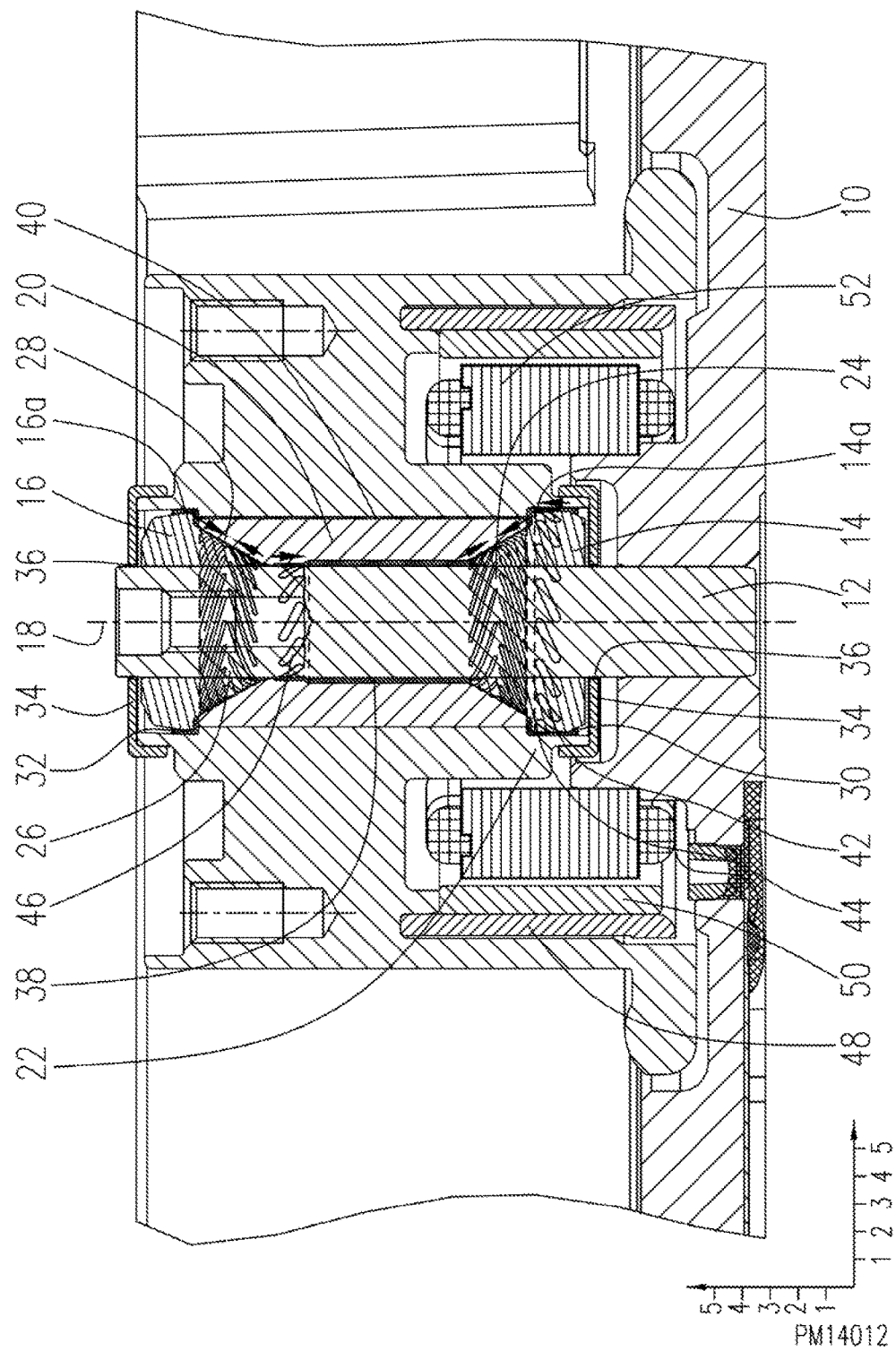

FLUID-DYNAMIC BEARING SYSTEM

FIELD OF THE INVENTION

The invention relates to a fluid-dynamic bearing system, in particular a fluid-dynamic bearing system having two conical bearings.

STATE OF THE ART

Fluid-dynamic bearing systems are used, for example, for the rotary support of spindle motors or fans. The prior-art fluid-dynamic bearing systems comprise at least one fixed and at least one rotatable bearing component. The two bearing components comprise bearing surfaces characterized by bearing groove structures. The bearing surfaces are separated from each other by a bearing gap which is filled with a bearing fluid, such as bearing oil. In the operation of the bearing, the bearing groove structures generate a pumping action on the bearing fluid present in the bearing gap, thus building up a hydro-dynamic pressure within the bearing gap which gives the bearing its load bearing capability. There are fluid-dynamic radial bearings, fluid-dynamic axial bearings, and fluid-dynamic conical bearings. While the bearing surface in a radial bearing is parallel to the rotation axis and in an axial bearing the bearing surface is normal to a rotation axis, the bearing surface in conical bearings is oblique to the rotation axis. This enables conical bearings to withstand forces not only in the radial or axial direction, but in both directions simultaneously.

U.S. Pat. No. 8,144,423 B2 discloses a spindle motor for a hard disk drive comprising a fluid-dynamic conical bearing system. On a fixed shaft, two conical bearing components are arranged at an axial distance to each other, which together with a rotating hub form two conical bearings. A contiguous bearing gap connects the two conical bearings and is sealed off at both of its ends by conical capillary seals. The capillary seals are formed between two covering caps and the conical bearing components. Recirculation channels extend through the hub and open out into the bearing gap below the covering caps. The bearing described has the drawback that under the influence of external shocks or vibrations bearing fluid can leak from the bearing gap and enter into the motor cavity. Moreover, because the recirculation channels are formed as bores in the hub, a minimum diameter relative to the length of the recirculation channels is necessary. With greater structural heights, this can lead to relatively large diameters of the recirculation channels. Furthermore, the design shown has the drawback that the bearing system can only be filled with bearing fluid after the covering caps have been mounted.

DISCLOSURE OF THE INVENTION

It is the object of the invention to provide a fluid-dynamic bearing system having a great structural height, wherein the leakage of bearing fluid from the bearing gap under the influence of external shocks or vibrations is minimized.

The object is achieved according to the invention by a fluid-dynamic bearing system having the features of the independent claims.

The fluid-dynamic bearing system comprises a first conical bearing and a second conical bearing counteracting the first conical bearing, a fixed shaft along which the two conical bearings are arranged, and a sleeve, which rotates about a rotation axis together with a hub. It also comprises a first and a second conical bearing component, which together with the sleeve form the first and second conical bearings, and bearing structures applied to the sleeve and/or the conical bearing components. Furthermore, the fluid-dynamic bearing also comprises a bearing gap filled with a bearing fluid, extending between the sleeve and the shaft and between the sleeve and the conical bearing components, and sealed at each of its ends by a capillary seal.

According to the present invention, a pump seal is arranged between the first conical bearing and the adjacent capillary seal. This first pump seal, in addition to the conical capillary seal, minimizes the risk of bearing fluid leaking from the bearing gap under the influence of shocks or vibrations and thus entering into the motor cavity. The first pump seal comprises groove structures extending at an oblique angle to the rotation axis, which convey the bearing fluid into the interior of the bearing as the sleeve rotates.

Preferably, pump structures are arranged between the first and second conical bearings. These pump structures enable the bearing fluid to circulate through the bearing gap. The pump structures also have grooves extending at an oblique angle to the rotation axis, which convey the bearing fluid in an opposing direction to the pumping direction of the first pump seal as the sleeve rotates.

In an embodiment of the fluid-dynamic bearing according to the present invention, the conical bearing components have radially outwardly extending collars. Radially extending sections of the bearing gap have a larger gap width in the area of these collars than in the area of the conical bearing surfaces.

A separator gap is preferably arranged between the first conical bearing and the pump structures, formed between the two conical bearings, which is completely filled with bearing fluid and has a larger gap width than the bearing gap in the area of the conical bearing and the pump structures. The power consumption of the bearing can be reduced by means of this separator gap.

In a preferred embodiment of the invention, at least one recirculation channel is arranged between the sleeve and the hub, by means of which circulation of the bearing fluid is ensured within the bearing, and farther removed sections of the bearing gap between the capillary seals and the conical bearings are connected with each other. The at least one recirculation channel is formed by at least one groove in the sleeve and/or the hub. It is thus possible to realize a fluid-dynamic bearing system having a great structural height and a small diameter of the recirculation channel. The ends of the at least one recirculation channel preferably open out into the wide, radially extending bearing gap in the area of the collar of the conical bearing components.

The capillary seals sealing the bearing gap at both of its ends are preferably arranged between the conical bearing components and the hub. This has the advantage that the bearing can be filled with bearing fluid before covering caps, affording additional protection against bearing fluid leaking from the bearing gap, are mounted on the hub.

Preferably, the pump seal is arranged between the first conical bearing component and the hub. The pump structures arranged between the separator gap and the second conical bearing are preferably arranged between the shaft and the sleeve.

The gap width of the bearing gap in the area of the pump seal is preferably larger than in the area of the conical bearing. The gap width of the bearing gap in the area of the pump structures is also larger than in the area of the conical bearings.

The fluid-dynamic bearing system according to the present invention can preferably be used for the rotary support of a spindle motor which can be used for driving, for example, hard disk drives, optical drives or fans by means of an electromagnetic drive system.

The invention will be described in the following in more detail on the basis of a preferred exemplary embodiment with reference to the accompanying drawing. Further features and advantages of the invention will thus be derived.

BRIEF DESCRIPTION OF THE DRAWING

FIG. 1 shows a half section of the spindle motor comprising a fluid-dynamic bearing system according to the present invention.

DESCRIPTION OF A PREFERRED EXEMPLARY EMBODIMENT OF THE INVENTION

FIG. 1 shows a section through a spindle motor comprising a fluid-dynamic bearing system with two mutually symmetrical conical bearings.

A base plate 10 has a bore in which a fixed shaft 12 is arranged. On the shaft 12, two conical bearing components 14, 16, having conical bearing surfaces, are arranged at an axial distance from each other. The base plate 10, the shaft 12 and the two conical bearing components 14, 16 form the fixed component of the spindle motor. A sleeve 20 rotatable about a rotation axis 18 can be made of steel, for example, and comprises a bore as well as two end-side hollow conical recesses in which the shaft 12 and the two conical bearing components 14, 16 are received. The axial relative movement of the sleeve 20 with respect to the fixed component, the so-called axial play, can be between 10 and 20 μm, for example about 14 μm. A hub 22 can be made, for example, of aluminum and is joined to the sleeve 20 in an anti-rotation manner. The sleeve 20 and the hub 22 together form the rotating component of the spindle motor. The bearing surfaces of the conical bearing components 14, 16 together with the opposite bearing surfaces of the sleeve 20 form the conical bearings 24, 26.

The conical bearing components 14, 16 extend at a sharp angle of for example 30° obliquely to the outside in the area of the conical bearing surfaces, as seen from the side facing the bearing center in the direction of the outside of the bearing. This surface has a very large radius of for example 250 mm, which is referred to as a "crowning" and by means of which it is ensured that the surfaces of the sleeve 20 and the conical bearing components 14, 16 do not jam in this area. Alternatively or additionally this radius can also be provided in each of the opposing surfaces of the sleeve 20. The sleeve 20 and/or the conical bearing components 14, 16 comprise fishbone-like bearing groove structures, which exert a pumping action on the bearing fluid in the direction of the apex, i.e. about the central area of the bearing grooves as the bearing system is operated, giving the conical bearings 24, 26 their load-bearing capability. Since the legs of the fishbone-like bearing grooves facing toward the outside of the bearing, which exert a pumping action on the bearing fluid in the direction of the interior of the bearing as the bearing rotates, are longer than the legs of the fishbone-like bearing grooves facing toward the inside of the bearing, which convey the bearing fluid toward the outside of the bearing and are also arranged at a comparatively larger radius, the pumping action on the bearing fluid directed towards the interior of the bearing is predominant. A resulting pumping direction towards the center of the bearing is thus created. This ensures that there is no negative pressure between the two conical bearings 24, 26, which prevents gas from leaking from the bearing fluid. The arrows indicate the pumping direction in each of the groove structures.

Opposing surfaces of the sleeve 20 and the shaft 12 as well as the conical bearing components 14, 16, which could come into contact at standstill or at low speeds, are separated from each other by a bearing gap 28 filled with a bearing fluid. The ends of the bearing gap 28 are sealed by conical capillary seals 30, 32 arranged between the inner circumference of the hub 22 and the outer circumference of the conical bearing components 14, 16.

Radially outwardly extending collars 14a, 16a contiguously extend in an axial direction toward the exterior of the bearing at the bearing surfaces of the conical bearing components 14, 16. Radially extending sections of the bearing gap 28, having a larger gap width than the bearing gap 28 in the area of the conical bearings 24, 26, extend below the collars 14a, 16a. These widened sections of the bearing gap 28 have a preferred gap width of between 150 and 200 μm, such as 177 μm, and improve the behavior of the fluid-dynamic bearing under the influence of external shocks or vibrations.

The external circumferential surface of the collar 14a of the bottom conical bearing component 14 first extends parallel to the rotation axis 18 (in this area, there is a pump seal which will be described in more detail further below) and in the area of the bottom capillary seal 30 is inclined at an angle of 25°, preferably this angle is in a range between 10° and 40°, with respect to the rotation axis 18. The inner circumferential surface of the hub 22 extends parallel to the rotation axis 18 in the area of the bottom capillary seal 30. The bottom capillary seal 30 thus has a conical cross-section. The gap width of the bottom capillary seal 30 on the narrow side facing the bearing gap 28 is between 100 and 200 μm, for example 159 μm, while on the wide side facing the ambient atmosphere it is between 180 and 200 μm, for example 194 μm.

The external circumferential surface of the collar 16a of the top conical bearing component 16 first extends parallel to the rotation axis 18 in the area of the capillary seal 32, then inclines at an angle of between 3° and 20°, about 9°, with respect to the rotation axis 18 and then bends at an angle greater than 45° and smaller than 90°, for example 56°, towards the inside. The small initial angle of 9° provides, on the one hand, a shock-resistant capillary seal, and the comparatively large angle of 56° provides, on the other hand, a large oil filling volume since the fluid-dynamic bearing is filled with bearing fluid preferably from above. In the area of the top capillary seal 32, the inner circumferential surface of the hub 22 extends toward the outside of the bearing at an angle of for example 2° to the inside. This results in the capillary seal 32 also having a conical cross-section and a large opening, which facilitates the filling process of the bearing system with bearing fluid. The gap width of the top capillary seal 32 on the narrow side facing the bearing gap 28 is thus between 20 and 40 μm, for example 27 μm, while on the wide side facing the ambient atmosphere it is between 150 and 200 μm, for example 174 μm.

Covering caps 34 are mounted at each of the top and bottom of the hub 22, which rotate together with the hub 22 about the shaft 12 and cover the conical capillary seals 30, 32. Between the shaft 12 and the covering caps 34, narrow air gaps remain, forming so-called gap seals 36, which minimize evaporation of the bearing fluid from the bearing gap 28, or the capillary seals 30, 32.

Between the two conical bearings 24, 26, adjacent to the bottom conical bearing 24, between the shaft 12 and the sleeve 20, a separator gap 38 is arranged. The gap 38 is part of the bearing gap 28 and completely filled with bearing fluid. The separator gap 38 is formed in the sleeve 20 and/or the shaft 12 and has a greater gap width than the bearing gap 28 in the area of the conical bearings 24, 26. While the bearing gap 28 in the area of the conical bearings 24, 26 has a gap width of between 2 and 5 µm, for example 3.5 µm, the gap width of the separator gap 38 is between 80 and 120 µm, for example about 100 µm.

At least one recirculation channel, but preferably a plurality of recirculation channels 40, is arranged between the sleeve 20 and the hub 22. Each of their ends opens out into the widened section of the bearing gap 28 in the area of the collars 14a, 16a of the conical bearing components 14, 16, and thus ensures that the bearing fluid can circulate through the bearing and separator gaps 26, 38. The recirculation channels 40 have an almost D-shaped cross-section, and are formed as grooves in the sleeve 20, such as by means of ECM. These grooves can be formed with a depth of between 80 and 100 µm, for example 90 µm, and alternatively or additionally can be machined into the hub 20. The recirculation channels 40 extend in the axial direction and are arranged radially offset towards the inside relative to the conical capillary seals 30, 32, thus preventing bearing fluid leaking from the capillary seals under the influence of axial shocks on the bearing.

A pump seal 42 is arranged in the axial direction between the bottom capillary seal 30 and the widened section of the bearing gap 28 in the area of the collar 14a of the conical bearing component 14. It consists of spiral-shaped grooves formed in the hub 22 and/or the conical bearing component 14 which pump the bearing fluid toward the interior of the bearing as the sleeve 20 rotates. This pump seal 42 reduces the risk of bearing fluid leaking from the bearing gap 28 due to vibrations or under the influence of external shocks and entering into the motor cavity. Between the widened section of the bearing gap 28 and the pump seal 42, in the axial direction, a so-called quiet zone 44 is arranged along which no pump structures of the pump seal are arranged and which ensures that no air is introduced into the bearing gap 28. The gap width in the area of the pump seal 42 and the quiet zone 44 is preferably between 20 and 40 µm, for example 27 µm.

Optionally, between the top conical bearing 26 and the separator gap 38, axially arranged, spiral-shaped pump structures 46 can be arranged, which pump the bearing fluid toward the bottom conical bearing 24 as the bearing rotates. These pump structures 46 create an asymmetry in the bearing and ensure that the bearing fluid circulates through the bearing and the recirculation channels 40. The flow of the bearing fluid is from the top down through the top conical bearing 26, the separator gap 38 and the bottom conical bearing 24 and from the bottom up through the recirculation channels 40. The gap width of the bearing gap 28 in the area of the pump structures 46 is preferably between 10 and 20 µm, for example about 13 µm.

Herein, the pump seal 42 arranged between the bottom capillary seal 30 and the widened section of the bearing gap 28 in the area of the collar 14a of the conical bearing component 14 always pumps against the pumping direction of the pump structures 46 arranged between the top conical bearing 26 and the separator gap 38.

Alternatively or additionally, the pump structures can also be arranged between the separator gap 38 and the bottom conical bearing 24, wherein the pump structures also pump the bearing fluid axially downwards in the area of the separator gap 38 towards the bottom conical bearing 24 as the bearing rotates.

Furthermore, it is also possible as an alternative (not shown in the drawing) to reverse the pumping direction of the pump structures 46 in such a way that they axially pump the bearing fluid upwards in the area of the separator gap 38; in this case, however, the pump bearing must be arranged at the top conical bearing component instead of the bottom one, as shown in the drawing.

The hub 22 preferably consists of aluminum or steel, and in the case shown in the drawing, where aluminum is used, it has an edge, on the inner diameter of which a back iron 48 is attached for a rotor magnet 50. The rotor magnet 50 concentrically encloses a stator assembly 52, which is attached on the base plate 10. The stator assembly 52 attached on the base plate 10 together with the rotor magnet 50 and the back iron 48 forms the electromagnetic drive system of the spindle motor.

The spindle motor shown here can be used for driving a hard disk drive. For this purpose, one or more, such as for example six, storage disks (not shown in the drawing) can be fixed on the hub 22. Furthermore, the spindle motor can also be used for driving a fan impeller.

In the exemplary embodiment shown here, the hub and the sleeve are two separate components of different materials. The hub and the sleeve can also be integrally formed (not shown in the drawing) and can be made of steel, for example. In this case the back iron of the electromagnetic drive system can be dispensed with. Furthermore, the recirculation channels are not formed as grooves but are drilled.

The two conical bearing components could also be arranged in exchanged positions (not shown in the drawing). In that case the internal circumference of the hub extends at an angle inclined toward the inside by 2°, while at the top it extends parallel to the rotation axis. Along the collar of the bottom conical bearing component, there is then no pump seal, but instead the capillary seal formed over a relatively long distance in the axial direction is provided with a large gap width. The pump seal with the quiet zone is then arranged along the collar of the top conical bearing component, the capillary seal is formed to be shorter and has a smaller gap width than the capillary seal on the other side of the bearing. The optional pump structures are then adjacent to the conical bearing component, having no pump seal arranged along its collar, thus adjacent to the bottom conical bearing.

LIST OF REFERENCE NUMERALS 10 base plate
12 shaft
14, 16 conical bearing component
14a, 16a collar
18 rotation axis
20 sleeve
22 hub
24, 26 conical bearing
28 bearing gap
30, 32 capillary seal
34 covering cap
36 gap seal
38 separator gap
40 recirculation channel
42 pump seal
44 quiet zone
46 pump structures 48 back iron
50 rotor magnet
52 stator assembly

The invention claimed is:
1. A fluid-dynamic bearing system, comprising
a first conical bearing and a second conical bearing counteracting the first conical bearing,
a shaft along which the first and second conical bearings are arranged,
a sleeve,
a first conical bearing component and a second conical bearing component, which together with the sleeve form the first and second conical bearings,
bearing structures applied to the sleeve and/or the first and second conical bearing components,
a bearing gap filled with a bearing fluid extending between the sleeve and the shaft and between the sleeve and the conical bearing components and sealed at its ends by a first capillary seal and a second capillary seal,
a hub which rotates together with the sleeve about a rotation axis,
wherein a pump seal is arranged between the first conical bearing and the adjacent first capillary seal, wherein a separator gap filled with the bearing fluid is arranged between, and forms at least a portion of a fluid path between, the first conical bearing and the second conical bearing, wherein pump structures are arranged between the separator gap and the second conical bearing and lie adjacent to the second conical bearing, and wherein the pump structures convey the bearing fluid in an axial direction toward the first conical bearing during rotation of the hub and the sleeve about the rotation axis.

2. The fluid-dynamic bearing system according to claim 1, wherein each of the first and second conical bearing components has a collar extending in a radially outer direction perpendicular to the rotation axis.

3. The fluid-dynamic bearing system according to claim 2, wherein the collar is adjacent to the first conical bearing component or the second conical bearing component, and wherein a radially extending section of the bearing gap adjacent to the collar has a larger gap width than a section of the bearing gap adjacent to the conical bearing component that is adjacent to the collar.

4. The fluid-dynamic bearing system according to claim 1, wherein the separator gap has a larger gap width than a section of the bearing gap adjacent to the first conical bearing, than a section of the bearing gap adjacent to the second conical bearing, and than a section of the bearing gap adjacent to the pump structures.

5. The fluid-dynamic bearing system according to claim 1, wherein at least one recirculation channel is arranged between the sleeve and the hub.

6. The fluid-dynamic bearing system according to claim 5, wherein the at least one recirculation channel connects a section of the bearing gap between the first capillary seal and the first conical bearing to a section of the bearing gap between the second capillary seal and the second conical bearing.

7. The fluid-dynamic bearing system according to claim 6, wherein a first collar is adjacent to the first conical bearing component and a second collar is adjacent to the second conical bearing component, and wherein the ends of the at least one recirculation channel open out into a wide section of the bearing gap in the area of the collars of the first and second conical bearing components.

8. The fluid-dynamic bearing system according to claim 5, wherein the at least one recirculation channel is formed as a groove in the sleeve and/or a groove in the hub.

9. The fluid-dynamic bearing system according to claim 1, wherein the first and second capillary seals are arranged between the first and second conical bearing components and the hub.

10. The fluid-dynamic bearing system according to claim 1, wherein the pump seal is arranged between the first conical bearing component and the hub.

11. The fluid-dynamic bearing system according to claim 1, wherein the pump structures are arranged between the shaft and the sleeve.

12. The fluid-dynamic bearing system according to claim 1, wherein a section of the bearing gap adjacent to the pump seal has a larger gap width than a section of the bearing gap adjacent to the first conical bearing and than a section of the bearing gap adjacent to the second conical bearing.

13. The fluid-dynamic bearing system according to claim 1, wherein a section of the bearing gap adjacent to the pump structures has a larger gap width than a section of the bearing gap adjacent to the first conical bearing and than a section of the bearing gap adjacent to the second conical bearing.

14. The fluid-dynamic bearing system according to claim 1, wherein the sleeve and the hub have a one-piece configuration.

15. A spindle motor, comprising an electromagnetic driving system consisting of a stator assembly and a rotor magnet and a fluid-dynamic bearing system according to claim 1.

16. The spindle motor according to claim 15, for driving a hard-disk drive.

17. The spindle motor according to claim 15, for driving a fan.

18. A fluid-dynamic bearing system, comprising:
a first conical bearing and a second conical bearing counteracting the first conical bearing,
a shaft along which the first and second conical bearings are arranged,
a sleeve,
a first conical bearing component and a second conical bearing component, which together with the sleeve form the first and second conical bearings,
bearing structures applied to the sleeve and/or the first and second conical bearing components,
a bearing gap filled with a bearing fluid extending between the sleeve and the shaft and between the sleeve and the first and second conical bearing components and sealed at its ends by a first capillary seal and a second capillary seal,
a hub which rotates together with the sleeve about a rotation axis,
wherein the first conical bearing component has an adjacent first collar extending in a radially outer direction perpendicular to the rotation axis, wherein the second conical bearing component has an adjacent second collar extending in a radially outer direction perpendicular to the rotation axis, wherein a radially extending section of the bearing gap adjacent to a surface of the first collar extending perpendicular to the rotation axis has a larger gap width than a section of the bearing gap adjacent to the first conical bearing component, and wherein a radially extending section of the bearing gap adjacent to a surface of the second collar extending perpendicular to the rotation axis has a larger gap width than an adjoining oblique section of the bearing gap adjacent to the second conical bearing component.

* * * * *